(12) United States Patent
Yuzawa

(10) Patent No.: US 12,490,942 B2
(45) Date of Patent: Dec. 9, 2025

(54) MEDICAL IMAGE DISPLAY APPARATUS, METHOD, AND PROGRAM

(71) Applicant: FUJIFILM Corporation, Tokyo (JP)

(72) Inventor: Takuya Yuzawa, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 309 days.

(21) Appl. No.: 18/333,522

(22) Filed: Jun. 12, 2023

(65) Prior Publication Data

US 2023/0320679 A1   Oct. 12, 2023

Related U.S. Application Data

(63) Continuation of application No. PCT/JP2021/044137, filed on Dec. 1, 2021.

(30) Foreign Application Priority Data

Jan. 18, 2021   (JP) ................. 2021-005805

(51) Int. Cl.
*A61B 6/03* (2006.01)
*A61B 6/00* (2024.01)
*G16H 30/20* (2018.01)
*G16H 30/40* (2018.01)

(52) U.S. Cl.
CPC ............ *A61B 6/037* (2013.01); *A61B 6/5229* (2013.01); *G16H 30/40* (2018.01); *G16H 30/20* (2018.01)

(58) Field of Classification Search
CPC ....... A61B 6/037; A61B 6/5229; A61B 6/466; A61B 6/5217; A61B 6/465; A61B 6/463; A61B 6/468; A61B 6/032; A61B 6/469; A61B 6/563; G16H 30/40; G16H 30/20
See application file for complete search history.

(56) References Cited

U.S. PATENT DOCUMENTS

| 5,779,634 A | 7/1998 | Ema et al. |
| 5,807,256 A | 9/1998 | Taguchi et al. |
| 2007/0286469 A1 | 12/2007 | Yamagata et al. |

FOREIGN PATENT DOCUMENTS

| JP | H04333972 | 11/1992 |
| JP | H06259486 | 9/1994 |
| JP | H0935043 | 2/1997 |
| JP | 2004173910 | 6/2004 |
| JP | 2006115921 | 5/2006 |
| JP | 2008012291 | 1/2008 |

(Continued)

OTHER PUBLICATIONS

"International Search Report (Form PCT/ISA/210) of PCT/JP2021/044137", mailed on Feb. 8, 2022, with English translation thereof, pp. 1-7.

(Continued)

*Primary Examiner* — Abhishek Sarma
(74) *Attorney, Agent, or Firm* — JCIPRNET

(57) ABSTRACT

There are provided a medical image display apparatus, method, and program capable of reducing a burden on a doctor in a case of interpreting a medical image. At least one processor is provided, and the processor acquires a detection result of at least one region of interest included in a medical image detected by analyzing the medical image, specifies at least one region of attention to which a user has paid attention in the medical image, and distinguishably displays the detection result of the region of interest and a specification result of the region of attention on a display.

8 Claims, 11 Drawing Sheets

(56) References Cited

FOREIGN PATENT DOCUMENTS

| | | |
|---|---|---|
| JP | 2012143368 | 8/2012 |
| WO | 2011132468 | 10/2011 |

OTHER PUBLICATIONS

"Written Opinion of the International Searching Authority (Form PCT/ISA/237) of PCT/JP2021/044137", mailed on Feb. 8, 2022, with English translation thereof, pp. 1-8.
"Office Action of Japan Counterpart Application", issued on Jun. 3, 2025, with English translation thereof, p. 1-p. 7.

FIG. 6
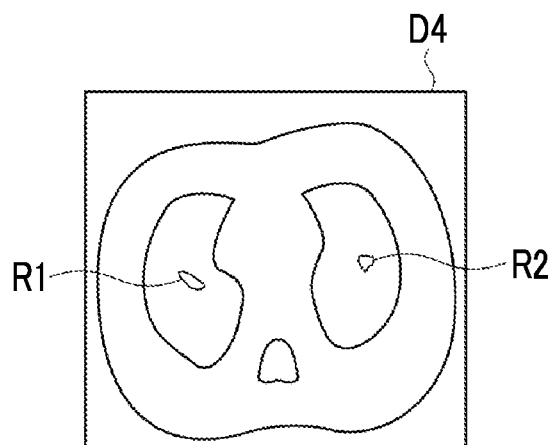
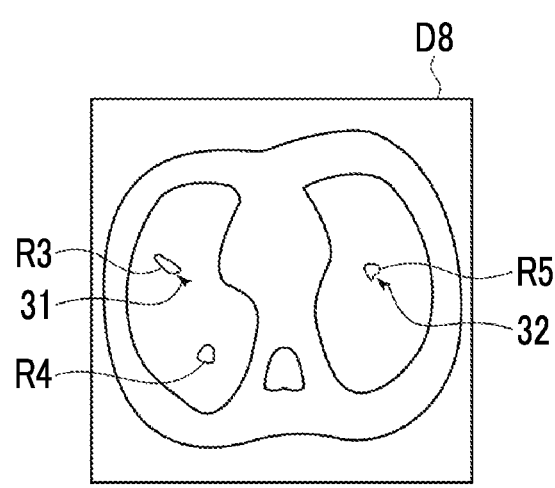
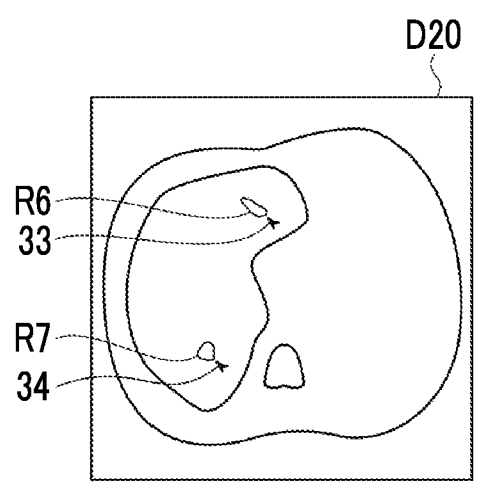

MEDICAL IMAGE DISPLAY APPARATUS, METHOD, AND PROGRAM

CROSS-REFERENCE TO RELATED APPLICATIONS

The present application is a Continuation of PCT International Application No. PCT/JP2021/044137, filed on Dec. 1, 2021, which claims priority to Japanese Patent Application No. 2021-005805, filed on Jan. 18, 2021. Each application above is hereby expressly incorporated by reference, in its entirety, into the present application.

BACKGROUND

Technical Field

The present disclosure relates to a medical image display apparatus, method, and program.

Related Art

In recent years, advances in medical apparatuses such as computed tomography (CT) apparatuses and magnetic resonance imaging (MRI) apparatuses have enabled image diagnosis using high-resolution medical images with higher quality.
In particular, since a region of a lesion can be accurately specified by image diagnosis using a CT image, an MRI image, and the like, appropriate treatment is being performed based on the specified result.

In addition, analysis of a medical image by computer-aided diagnosis (CAD) using a learning model in which machine learning is performed by deep learning or the like, and detection of a disease region such as a lesion included in the medical image as a region of interest from the medical image are also being performed. In this way, an analysis result generated by the analysis process using the CAD is stored in a database in association with examination information, such as a patient name, gender, age, and a modality which has acquired a medical image, and is provided for diagnosis. The doctor interprets the medical image on his or her interpretation terminal while referring to a distributed medical image and analysis result. In this case, an annotation is added to a region of interest including a disease included in the medical image based on the analysis result in the interpretation terminal. For example, a region surrounding the region of interest, an arrow indicating the region of interest, a type and size of the disease, and the like are added as annotations. A radiologist creates an interpretation report with reference to the annotations added to the region of interest.

On the other hand, the above-described analysis result of the medical image by the CAD is often used as a secondary interpretation (second reading) in a clinical site. For example, at the time of interpretation, first, a doctor interprets the medical image without referring to the analysis result by the CAD. Thereafter, the medical image to which the annotation is added based on the analysis result by the CAD is displayed, and the doctor performs the secondary interpretation of the medical image while referring to the annotation. By performing such primary interpretation and secondary interpretation, it is possible to prevent the disease region from being overlooked.

In addition, a method for efficiently performing the primary interpretation and the secondary interpretation has been proposed. For example, JP2006-115921A proposes a method for displaying an analysis result by CAD and an interpretation result by a doctor in a superimposed manner or in parallel. In addition, JP2006-115921A also proposes a method for extracting a feature amount of a medical image and storing the extracted feature amount in a database in a case where it is determined that the medical image is abnormal as a result of performing interpretation again by the doctor on the medical image which is not checked by interpretation by the doctor and is checked by the CAD.

However, in the method described in JP2006-115921A, the analysis result by the CAD and the interpretation result by the doctor are displayed in a superimposed manner or in parallel. For this reason, it is difficult to understand where an abnormality detected by the CAD but not detected in the interpretation by the doctor or an abnormality detected by the interpretation by the doctor but not detected by the CAD is included in the medical image. For this reason, a burden on the doctor in a case of interpreting the medical image is heavy.

SUMMARY OF THE INVENTION

The present disclosure has been made in view of the above circumstances, and an object of the present disclosure is to reduce a burden on a doctor in a case of interpreting a medical image.

A medical image display apparatus according to an aspect of the present disclosure comprises at least one processor, in which the processor is configured to: acquire a detection result of at least one region of interest included in a medical image, which is detected by analyzing the medical image; specify at least one region of attention to which a user has paid attention in the medical image; and distinguishably display the detection result of the region of interest and a specification result of the region of attention on a display.

In the medical image display apparatus according to the aspect of the present disclosure, the processor may collate the detection result of the region of interest with the specification result of the region of attention to specify a non-attention region of interest other than the region of attention among the regions of interest included in the detection result; and highlight the non-attention region of interest.

In the medical image display apparatus according to the aspect of the present disclosure, the processor may collate the detection result of the region of interest with the specification result of the region of attention to specify an attention region of interest other than the region of interest included in the detection result among the regions of attention, and highlight the attention region of interest.

In the medical image display apparatus according to the aspect of the present disclosure, in a case where the medical image is a three-dimensional image consisting of a plurality of tomographic images, the processor may display a paging slider schematically showing positions of tomographic planes of the plurality of tomographic images, collate the detection result of the region of interest with the specification result of the region of attention to specify a tomographic image including a non-attention region of interest other than the region of attention among the regions of interest included in the detection result, and highlight a position of a tomographic plane of the specified tomographic image on the paging slider.

In the medical image display apparatus according to the aspect of the present disclosure, the processor may distinguishably highlight a position of a tomographic plane of a tomographic image in which all included regions of interest are the non-attention regions of interest and a position of a tomographic plane of a tomographic image in which a part of the included regions of interest is the non-attention region of interest.

In the medical image display apparatus according to the aspect of the present disclosure, the processor may acquire the detection result of at least one region of interest included in the medical image by analyzing the medical image.

In the medical image display apparatus according to the aspect of the present disclosure, the processor may specify the region of attention based on an operation of the user at a time of interpretation of the medical image.

A medical image display method according to another aspect of the present disclosure comprises: acquiring a detection result of at least one region of interest included in a medical image, which is detected by analyzing the medical image; specifying at least one region of attention to which a user has paid attention in the medical image; and distinguishably displaying the detection result of the region of interest and a specification result of the region of attention on a display.

A program that causes a computer to execute the medical image display method according to the other aspect of the present disclosure may be provided.

According to the present disclosure, it is possible to reduce a burden on a doctor in a case of interpreting a medical image.

BRIEF DESCRIPTION OF THE DRAWINGS

FIG. 6 is a diagram showing a specification result of a region of attention by a radiologist for a tomographic image.

DETAILED DESCRIPTION

Figure 1:
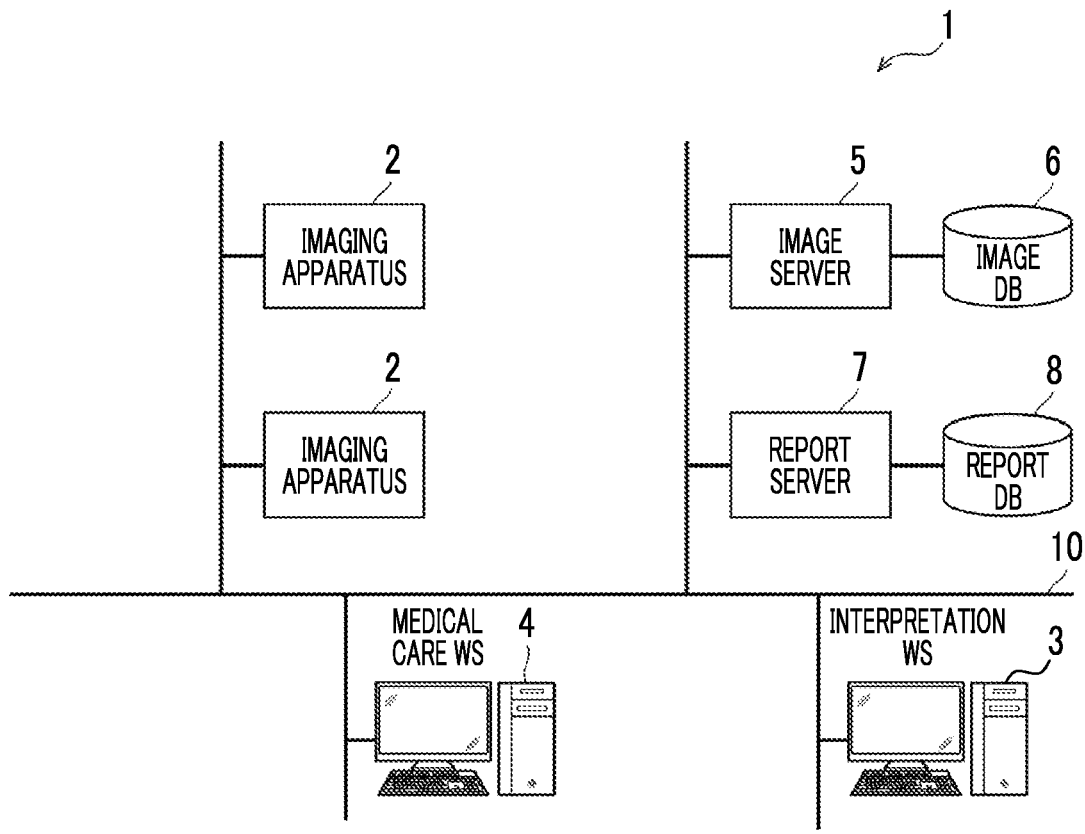
FIG. 1 is a diagram showing a schematic configuration of a medical information system to which a medical image display apparatus according to a first embodiment of the present disclosure is applied.

Hereinafter, embodiments of the present disclosure will be described with reference to the drawings. First, a configuration of a medical information system 1 to which a medical image display apparatus according to the present embodiment is applied will be described. FIG. 1 is a diagram showing a schematic configuration of a medical information system 1. A medical information system 1 shown in FIG. 1 is a system for performing, based on an examination order from a doctor in a clinical department using a known ordering system, imaging of an examination target part of a subject, storage of a medical image acquired by imaging, interpretation of the medical image and creation of an interpretation report by a radiologist, and browsing of the interpretation report and detailed observation of a medical image to be interpreted by the doctor in the clinical department of a request source.

As shown in FIG. 1, the medical information system 1 is configured by connecting a plurality of imaging apparatuses 2, a plurality of interpretation workstations (WS) 3 that are interpretation terminals, a medical care WS 4, an image server 5, an image database (hereinafter, referred to as an image DB) 6, a report server 7, and a report database (hereinafter, referred to as a report DB) 8 through a wired or wireless network 10 in a communicable state.

Each apparatus is a computer on which an application program for causing each apparatus to function as a component of the medical information system 1 is installed. The application program is stored in a storage device of a server computer connected to the network 10 or in a network storage in a state of being accessible from the outside, and is downloaded to and installed in the computer in response to a request. Alternatively, the program is recorded on a recording medium such as a digital versatile disc (DVD) or a compact disc read only memory (CD-ROM), is distributed, and is installed in the computer from the recording medium.

The imaging apparatus 2 is an apparatus (modality) that generates a medical image showing a diagnosis target part of the subject by imaging the diagnosis target part of the subject. Specifically, examples of the modality include a simple X-ray imaging apparatus, a CT apparatus, an MRI apparatus, a positron emission tomography (PET) apparatus, and the like. The medical image generated by the imaging apparatus 2 is transmitted to the image server 5 and stored in the image DB 6.

The interpretation WS 3 is a computer used by, for example, a radiologist of a radiology department to interpret a medical image and to create an interpretation report, and includes a medical image display apparatus 20 according to a first embodiment. In the interpretation WS 3, a request for browsing the medical image to the image server 5, various types of image processing on the medical image received from the image server 5, display of the medical image, input reception of a finding sentence regarding the medical image, and the like are performed. In the interpretation WS 3, creation of an interpretation report, a registration request and a browsing request for the interpretation report to the report server 7, display of the interpretation report received from the report server 7, and the like are performed. The above processes are performed by executing a software program for each process in the interpretation WS 3.

The medical care WS 4 is a computer used for detailed observation of an image, browsing of an interpretation report, creation of an electronic medical record, and the like by a doctor in a clinical department, and includes a processing device, a display apparatus such as a display, and an input device such as a keyboard and a mouse. In the medical care WS 4, a browsing request for the image to the image server 5, display of the image received from the image server 5, a browsing request for the interpretation report to the report server 7, and display of the interpretation report received from the report server 7 are performed. The above processes are performed by the medical care WS 4 executing a software program for each process.

The image server 5 is a general-purpose computer on which a software program for providing a function of a database management system (DBMS) is installed. Further, the image server 5 comprises a storage in which an image DB 6 is configured. The storage may be a hard disk device connected to the image server 5 via a data bus, or may be a disk device connected to a network attached storage (NAS) or a storage area network (SAN) connected to the network 10. In a case where the image server 5 receives a registration request for the medical image from the imaging apparatus 2, the image server 5 prepares the medical image in a database format and registers the medical image in the image DB 6.

Image data of the medical image acquired by the imaging apparatus 2 and accessory information are registered in the image DB 6. The accessory information includes, for example, an image identification (ID) for identifying each medical image, a patient ID for identifying a subject, an examination ID for identifying an examination, a unique identification (UID) assigned to each medical image, an examination date and examination time at which the medical image is generated, a type of an imaging apparatus used in an examination for acquiring the medical image, patient information such as a name, age, and gender of a patient, an examination part (imaging part), imaging information (imaging protocol, an imaging sequence, an imaging method, imaging conditions, use of a contrast medium, and the like), and information such as a series number or collection number in a case where a plurality of medical images are acquired in one examination.

In a case where a browsing request from the interpretation WS 3 and the medical care WS 4 is received through the network 10, the image server 5 searches for a medical image registered in the image DB 6 and transmits the searched for medical image to the interpretation WS 3 and the medical care WS 4 that are request sources.

A software program that provides a function of a database management system to a general-purpose computer is incorporated into the report server 7. In a case where the report server 7 receives the registration request for the interpretation report from the interpretation WS 3, the report server 7 prepares the interpretation report in a database format and registers the interpretation report in the report DB 8.

An interpretation report created by the radiologist using the interpretation WS 3 is registered in the report DB 8. The interpretation report may include, for example, information such as a medical image to be interpreted, an image ID for identifying the medical image, a radiologist ID for identifying the radiologist who has performed the interpretation, a disease name, positional information of the disease, and information for accessing the medical image.

In a case where the report server 7 receives the browsing request for the interpretation report from the interpretation WS 3 and the medical care WS 4 through the network 10, the report server 7 searches for the interpretation report registered in the report DB 8 and transmits the searched for interpretation report to the interpretation WS 3 and the medical care WS 4 that are request sources.

In the present embodiment, it is assumed that a diagnosis target is a thoracoabdominal part of a human body, the medical image is a three-dimensional CT image consisting of a plurality of tomographic images including the thoracoabdominal part, and the CT image is interpreted to create an interpretation report including a finding sentence for diseases of the lung, the liver, and the like included in the thoracoabdominal part. The medical image is not limited to the CT image, and any medical image such as an MRI image or a simple two-dimensional image acquired by a simple X-ray imaging apparatus can be used.

In the present embodiment, in creating the interpretation report, the radiologist first displays the medical image on a display 14 and interprets the medical image with his/her own eyes. Thereafter, the medical image is analyzed by the medical image display apparatus according to the present embodiment to detect a region of interest included in the medical image, and a second interpretation is performed using the detection result. The first interpretation is referred to as a primary interpretation, and the second interpretation using the detection result of the region of interest by the medical image display apparatus according to the present embodiment is referred to as a secondary interpretation.

The network 10 is a wired or wireless local area network that connects various apparatuses in a hospital to each other. In a case where the interpretation WS 3 is installed in another hospital or clinic, the network 10 may be configured to connect local area networks of respective hospitals to each other through the internet or a dedicated line.

Figure 2:
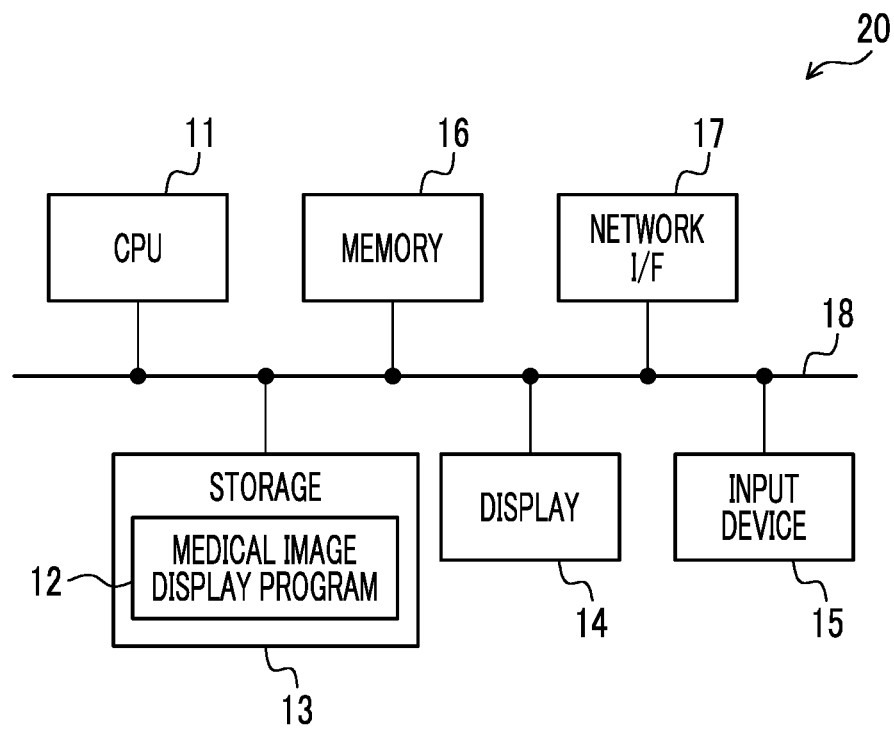
FIG. 2 is a diagram showing a schematic configuration of the medical image display apparatus according to the first embodiment.

Next, the medical image display apparatus according to the first embodiment will be described. FIG. 2 shows a hardware configuration of the medical image display apparatus according to the first embodiment. As shown in FIG. 2, the medical image display apparatus 20 includes a central processing unit (CPU) 11, a nonvolatile storage 13, and a memory 16 as a temporary storage area. The medical image display apparatus 20 includes a display 14 such as a liquid crystal display, an input device 15 including a pointing device such as a keyboard and a mouse, and a network interface (I/F) 17 connected to the network 10. The CPU 11, the storage 13, the display 14, the input device 15, the memory 16, and the network I/F 17 are connected to a bus 18.

The CPU 11 is an example of a processor in the present disclosure.

The storage 13 is realized by a hard disk drive (HDD), a solid state drive (SSD), a flash memory, or the like. In the storage 13 as a storage medium, a medical image display program 12 is stored. The CPU 11 reads out the medical image display program 12 from the storage 13, loads the read-out medical image display program 12 into the memory 16, and executes the loaded medical image display program 12.

Figure 3:
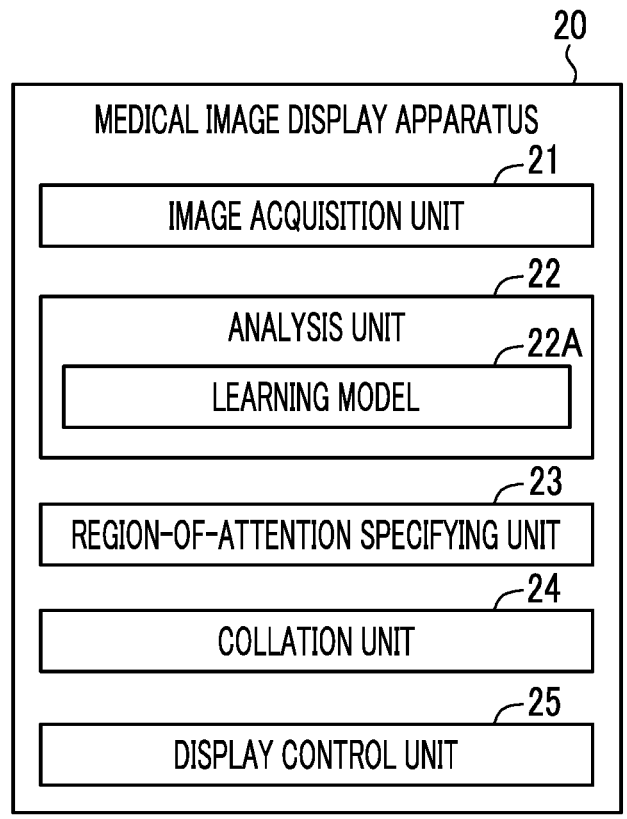
FIG. 3 is a functional configuration diagram of the medical image display apparatus according to the first embodiment.

Next, a functional configuration of the medical image display apparatus according to the first embodiment will be described. FIG. 3 is a diagram showing the functional configuration of the medical image display apparatus according to the first embodiment. As shown in FIG. 3, the medical image display apparatus 20 includes an information acquisition unit 21, an analysis unit 22, a region-of-attention specifying unit 23, a collation unit 24, and a display control unit 25. As the CPU 11 executes the medical image display program 12, the CPU 11 functions as the information acquisition unit 21, the analysis unit 22, the region-of-attention specifying unit 23, the collation unit 24, and the display control unit 25.

The information acquisition unit 21 acquires a target medical image G0 as a processing target for creating an interpretation report from the image server 5 in response to an instruction from the radiologist as an operation person through the input device 15. In the present embodiment, the target medical image G0 is a three-dimensional CT image consisting of a plurality of tomographic images acquired by imaging the thoracoabdominal part of the human body.

The analysis unit 22 detects a region of abnormal shadow included in the target medical image G0 as a region of interest. The analysis unit 22 detects the region of abnormal shadow as a region of interest from the target medical image G0 using a known algorithm of computer-aided diagnosis (that is, CAD).

Examples of the type of the abnormal shadow include a tumor, a pleural effusion, a nodule, a calcification, and a fracture according to a part of the subject included in the target medical image G0. The analysis unit 22 detects the region of the abnormal shadow included in a plurality of types of organs included in the target medical image G0 as the region of interest. In order to detect the region of interest, the analysis unit 22 includes a learning model 22A in which machine learning is performed to detect the abnormal shadow from the target medical image G0 as the region of interest.

The learning model 22A consists of a convolutional neural network (CNN) that is deep-learned using training data so as to discriminate whether or not each pixel (voxel) in the target medical image G0 represents an abnormal shadow.

The learning model 22A is constructed by training the CNN using, for example, a large number of pieces of training data consisting of a training image including an abnormal shadow, and correct answer data representing a region of the abnormal shadow and a property of the abnormal shadow in the training image, and training data consisting of training images not including the abnormal shadow. The learning model 22A derives a certainty factor (likelihood) representing that each pixel in the medical image is an abnormal shadow, and detects a region consisting of pixels of which the certainty factor is equal to or greater than a predetermined threshold value as a region of interest. Here, the certainty factor is a value of 0 or more and 1 or less.

The learning model 22A may detect the abnormal shadow from a three-dimensional medical image, but may detect the abnormal shadow from each of a plurality of tomographic images constituting the target medical image G0.

As the learning model 22A, any learning model such as, for example, a support vector machine (SVM) can be used in addition to the convolutional neural network.

Figure 4:
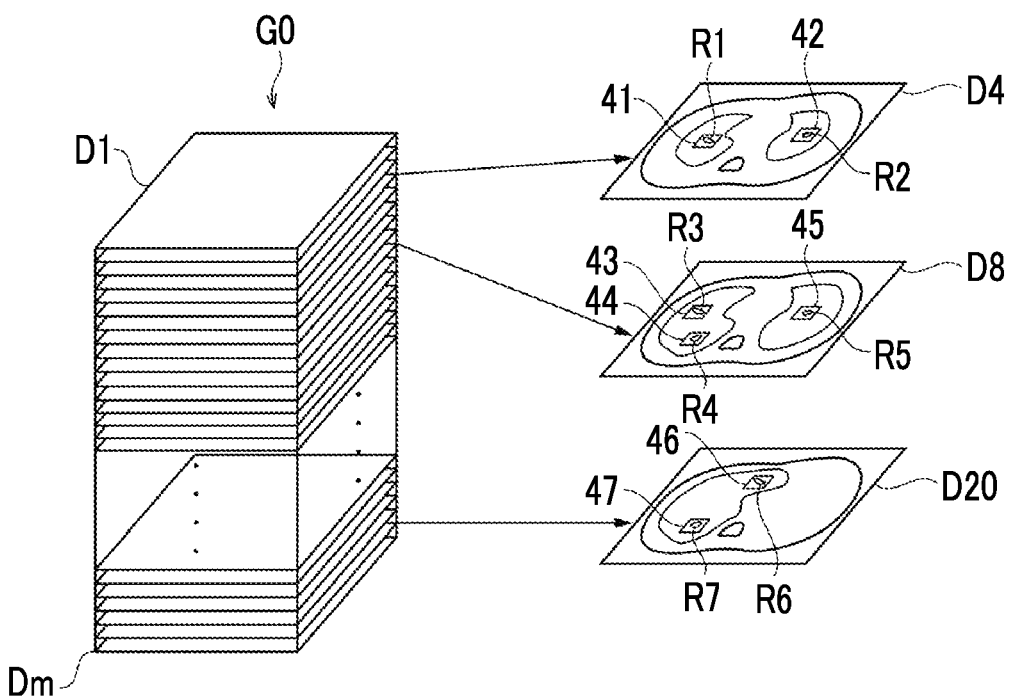
FIG. 4 is a diagram showing a detection result of a region of interest by an analysis unit.

FIG. 4 is a diagram showing a detection result of a region of interest by the analysis unit 22. In the present embodiment, the target medical image G0 is a CT image of the thoracoabdominal part of the human body and consists of tomographic images Dk (k=1 to m) of a plurality of axial cross sections. In the present embodiment, it is assumed that regions of interest are detected in tomographic images D4, D8, and D20 among a plurality of the tomographic images Dk as shown in FIG. 4.

Further, as shown in FIG. 4, in the tomographic image D4, two abnormal shadows are detected as regions of interest R1 and R2 and are surrounded by rectangular marks 41 and 42, respectively. In addition, in the tomographic image D8, three abnormal shadows are detected as regions of interest R3 to R5 and are surrounded by rectangular marks 43 to 45, respectively. In addition, in the tomographic image D20, two abnormal shadows are detected as regions of interest R6 and R7 and are surrounded by rectangular marks 46 and 47, respectively.

Figure 5:
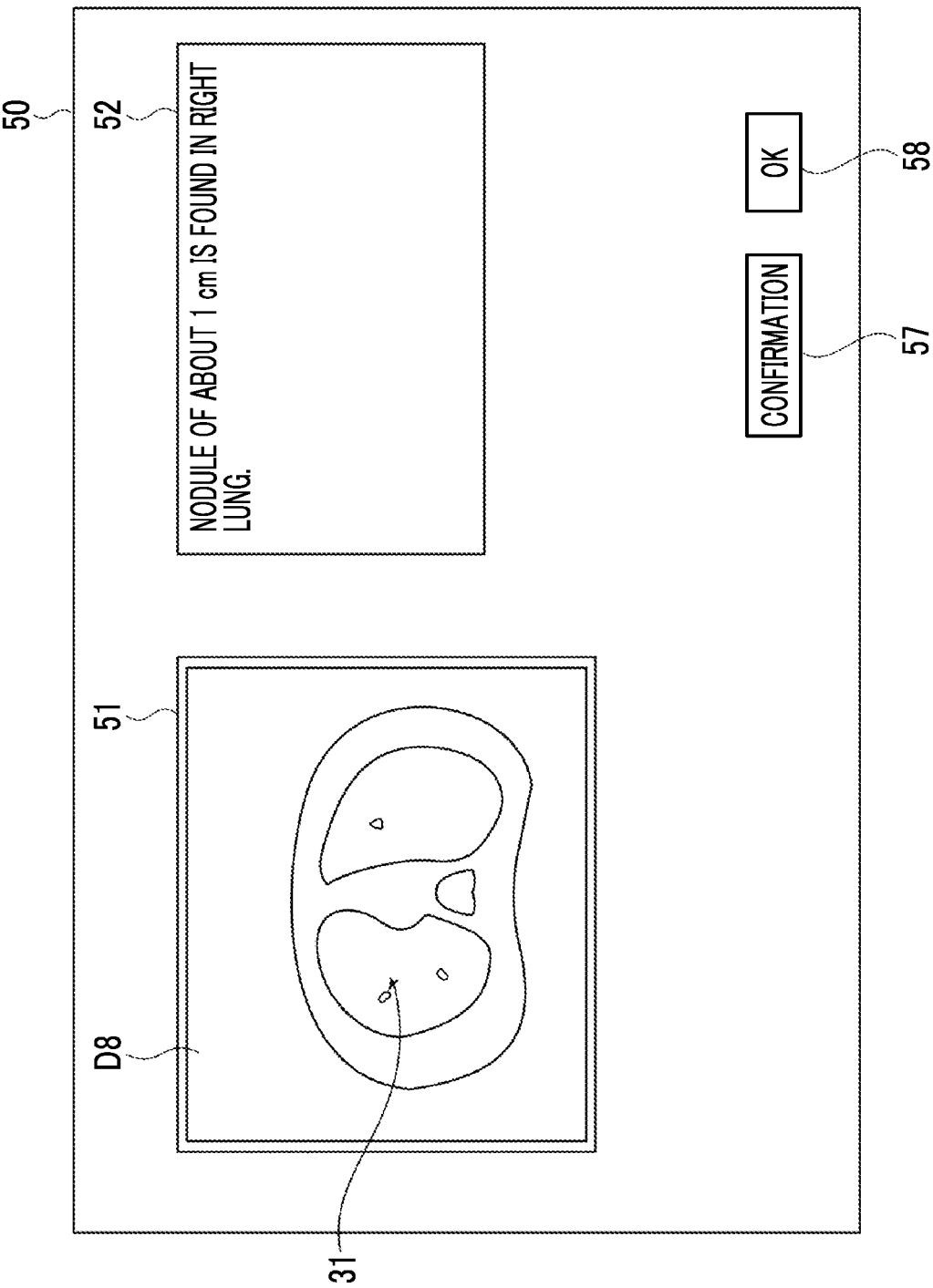
FIG. 5 is a diagram showing a display screen for a target medical image.

The region-of-attention specifying unit 23 specifies a region of attention to which the radiologist has paid attention in the target medical image G0. Specifically, as the primary interpretation, the radiologist displays the target medical image G0 on the display 14, interprets the target medical image G0, and specifies the found abnormal shadow as the region of attention. FIG. 5 is a diagram showing a display screen for a target medical image. As shown in FIG. 5, a display screen 50 includes an image display region 51 and a sentence display region 52. In the image display region 51, the tomographic image representing the tomographic plane of the target medical image G0 is displayed in a switchable manner. In FIG. 5, the tomographic image D8 shown in FIG. 4 is displayed in the image display region 51. In the sentence display region 52, a finding sentence by the radiologist who has interpreted the displayed tomographic image is described.

The radiologist can switch the tomographic image displayed in the image display region 51 by using the input device 15. Specifically, by rotating a scroll button of a mouse as the input device 15, the tomographic image displayed in the image display region 51 can be switched. In the primary interpretation, the radiologist clicks the mouse as the input device 15 at a position of the abnormal shadow of attention. Accordingly, an arrow-shaped mark 31 is added at the clicked position as shown in FIG. 5. As the mark, in addition to the arrow, a rectangle surrounding the abnormal shadow, a contour line of the abnormal shadow, or the like can be used.

Coordinates of the clicked position are stored in the memory 16 as the position of the region of attention. In addition, the mark may not be added to the clicked position. The region-of-attention specifying unit 23 specifies the abnormal shadow to which the mark is added as the region of attention. In a case where the mark is not added, the region-of-attention specifying unit 23 specifies the abnormal shadow at the clicked position as the region of attention.

The radiologist may designate the region of attention as a range by surrounding the region of attention with a rectangular region or tracing a contour line of the region of attention. In this case, the region-of-attention specifying unit 23 specifies the region of attention as a range.

The radiologist can input the finding sentence for the target medical image G0 to the sentence display region 52 by using the input device 15. In FIG. 5, a finding sentence "NODULE OF ABOUT 1 cm IS FOUND IN RIGHT LUNG" is described in the sentence display region 52.

FIG. 6 is a diagram showing a specification result of the region of attention by the radiologist for the tomographic image. As shown in FIG. 6, in the tomographic image D4, neither of two abnormal shadows detected as the regions of interest R1 and R2 by the analysis unit 22 is marked. Therefore, these two abnormal shadows are not specified as the region of attention. In the tomographic image D8, since the marks 31 and 32 are added to two abnormal shadows detected as the regions of interest R3 and R5 by the analysis unit 22, respectively, these two abnormal shadows are specified as the regions of attention. On the other hand, since the mark is not added to one abnormal shadow detected as the region of interest R4 by the analysis unit 22, the abnormal shadow is not specified as the region of attention. In the tomographic image D20, since the marks 33 and 34 are added to two abnormal shadows detected as the regions of interest R6 and R7 by the analysis unit 22, respectively, these two abnormal shadows are specified as the regions of attention.

In a case where the radiologist ends the primary interpretation, the radiologist selects a confirmation button 57 on the display screen 50. Accordingly, the secondary interpretation is started.

In the secondary interpretation, the collation unit 24 collates the detection result of the region of interest by the analysis unit 22 with the specification result of the region of attention by the region-of-attention specifying unit 23 to specify a non-attention region of interest other than the region of attention among the regions of interest detected by the analysis unit 22. In the first embodiment, as shown in FIG. 6, the region of attention is not specified in the tomographic image D4. In the tomographic image D8, the regions of interest R3 and R5 detected by the analysis unit 22 are specified as the regions of attention, but the region of interest R4 is not specified as the region of attention. In the tomographic image D20, the regions of interest R6 and R7 detected by the analysis unit 22 are specified as the regions of attention. Therefore, the collation unit 24 specifies the regions of interest R1 and R2 detected by the analysis unit 22 in the tomographic image D4 and the region of interest R4 detected by the analysis unit 22 in the tomographic image D8 as non-attention regions of interest. The regions of interest R3, R5, R6, and R7 specified as the regions of attention are attention regions of interest.

The display control unit 25 distinguishably displays the detection result of the region of interest by the analysis unit 22 and the specification result of the region of attention by the region-of-attention specifying unit 23 on the display 14. In the present embodiment, the display control unit 25 adds a mark to the non-attention region of interest specified by the collation unit 24 to highlight the non-attention region of interest among the regions of interest included in the detection result.

Figure 7:
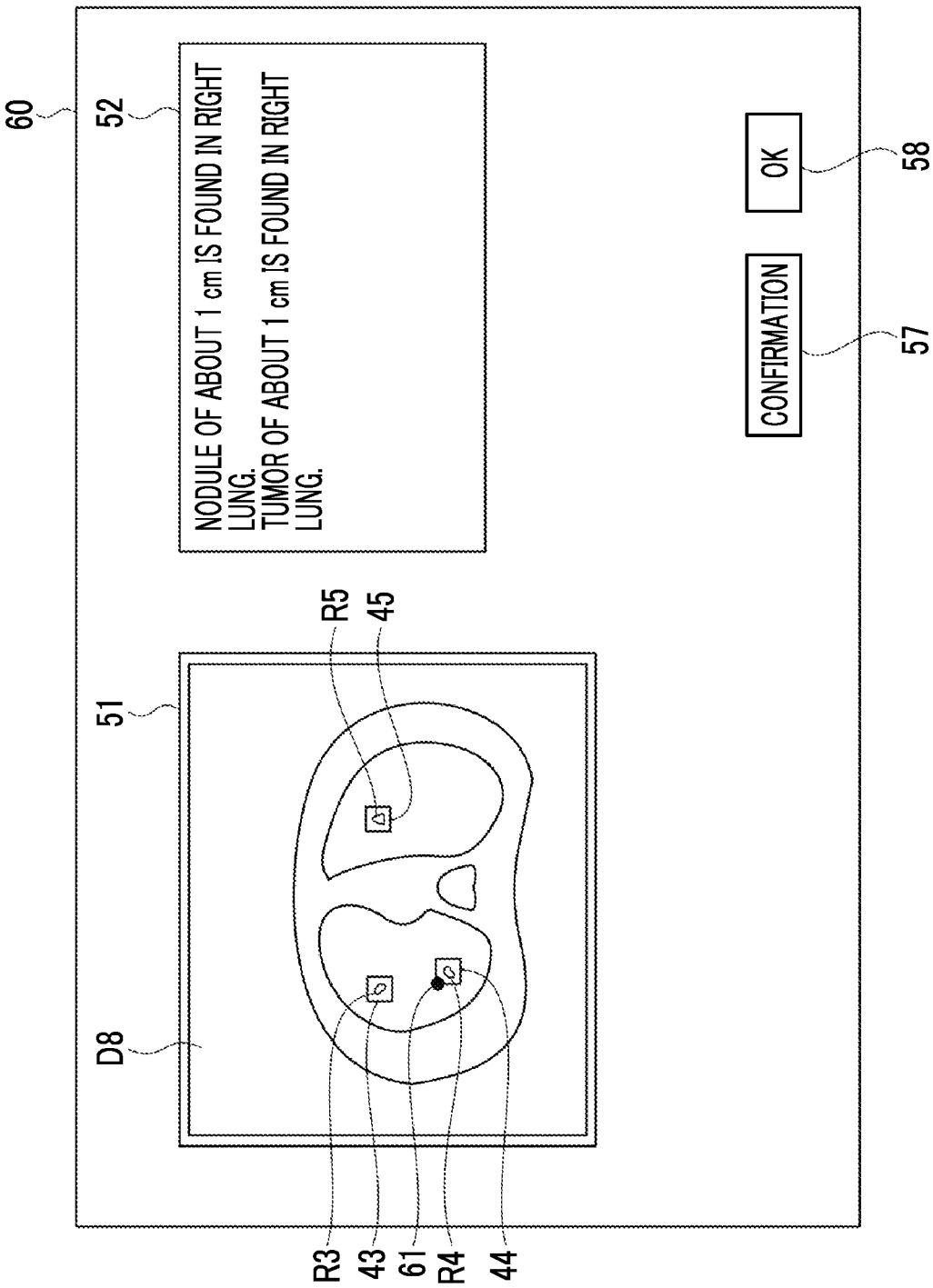
FIG. 7 is a diagram showing a display screen for the detection result of the region of interest and a specification result of an attention region of interest in the first embodiment.

FIG. 7 is a diagram showing a display screen for the detection result of the region of interest and the specification result of the attention region of interest in the first embodiment. In FIG. 7, the same components as those of FIG. 6 are denoted by the same references, and the detailed description thereof will not be repeated. As shown in FIG. 7, the tomographic image D8 is displayed in the image display region 51 of a display screen 60. In the tomographic image D8, the rectangular marks 43 to 45 are added to the regions of interest R3 to R5 detected by the analysis unit 22, respectively. In addition, among the regions of interest R3 to R5, a circular mark 61 is added to an upper left corner of the rectangular mark 44 in the region of interest R4 which is the non-attention region of interest, and thus the region of interest R4 is highlighted. A shape of the mark 61 is not limited to a circle, and the mark 61 may have any shape such as a star shape or a triangle shape or have a color. Further, instead of adding the circular mark, the color of the rectangular mark surrounding the region of interest may be changed, or a line type of the rectangular mark may be changed.

In a case where the tomographic image D4 is displayed in the image display region 51 instead of the tomographic image D8, since both the regions of interest R1 and R2 detected by the analysis unit 22 are the non-attention region of interest, the circular mark 61 is added to each of the rectangular marks 41 and 42 surrounding the regions of interest R1 and R2. In a case where the tomographic image D20 is displayed in the image display region 51 instead of the tomographic image D8, since both the regions of interest R6 and R7 detected by the analysis unit 22 are the attention regions of interest, the circular mark 61 is not added to the rectangular marks 46 and 47 surrounding the regions of interest R6 and R7.

The radiologist can confirm the presence of the abnormal shadow that may have been overlooked at the time of the primary interpretation based on the presence or absence of the circular mark 61 added to the rectangular mark. For example, as shown in FIG. 7, the circular mark 61 is added to the rectangular mark 44 surrounding the region of interest R4 detected by the analysis unit 22. Accordingly, the radiologist can easily confirm the presence of the abnormal shadow included in the right lung overlooked at the time of the primary interpretation. In this case, a finding sentence can be described in the sentence display region 52 for the confirmed abnormal shadow. For example, in a case where the region of interest R4 is a tumor, a finding sentence "TUMOR OF ABOUT 1 cm IS FOUND IN RIGHT LUNG" can be described in the sentence display region 52, as shown in FIG. 7.

In a case where the radiologist selects an OK button 58, an interpretation report including the finding sentence input to the sentence display region 52 is created. The created interpretation report is stored in the storage 13 together with the target medical image G0 and the detection result of the region of interest. Thereafter, the created interpretation report is transferred to the report server 7 together with the target medical image G0 and the detection result. In the report server 7, the transferred interpretation report is stored together with the target medical image G0 and the detection result.

Figure 8:
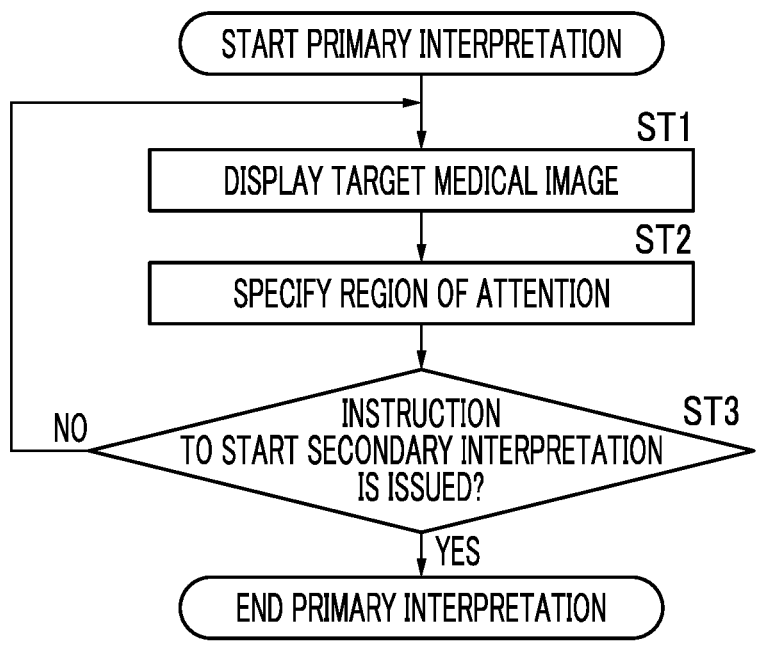
FIG. 8 is a flowchart showing a process performed at a time of primary interpretation in the first embodiment.
Figure 9:
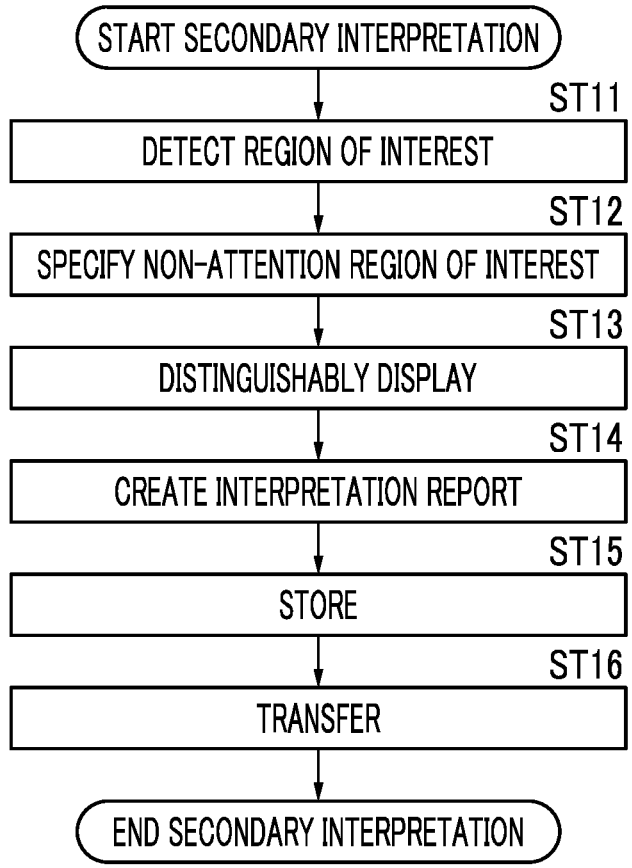
FIG. 9 is a flowchart showing a process performed at a time of secondary interpretation in the first embodiment.

Next, a process performed in the first embodiment will be described. FIG. 8 is a flowchart showing a process performed at the time of the primary interpretation in the first embodiment, and FIG. 9 is a flowchart showing a process performed at the time of the secondary interpretation in the first embodiment. It is assumed that the target medical image G0 to be interpreted is acquired from the image server 5 by the information acquisition unit 21 and is stored in the storage 13. The process is started in a case where the radiologist issues an instruction to create an interpretation report, and the display control unit 25 displays the target medical image G0 on the display 14 (step ST1). Next, the region-of-attention specifying unit 23 specifies a region of attention to which the radiologist has paid attention in the target medical image G0 based on the instruction from the radiologist using the input device 15 (step ST2). In this state, the radiologist can input a finding sentence related to the region of attention to the sentence display region 52.

Subsequently, by selecting the confirmation button 57, it is determined whether or not an instruction to start the secondary interpretation is issued (step ST3), and in a case where determination in step ST3 is negative, the process returns to step ST1. In a case where determination in step ST3 is affirmative, the primary interpretation ends and the secondary interpretation is started.

At the time of secondary interpretation, first, the analysis unit 22 detects at least one region of interest included in the target medical image G0 by analyzing the target medical image G0 (step ST11). The analysis of the target medical image G0 may be performed immediately after the information acquisition unit 21 acquires the target medical image G0 from the image server 5. In this case, since the analysis result is stored in the storage 13, a subsequent process is performed using the stored analysis result.

Next, the collation unit 24 collates the detection result of the region of interest by the analysis unit 22 with the specification result of the region of attention by the region-of-attention specifying unit 23 to specify the non-attention region of interest other than the attention region of interest among the regions of interest detected by the analysis unit 22 (step ST12).

Further, the display control unit 25 distinguishably displays the detection result of the region of interest by the analysis unit 22 and the specification result of the attention region of interest by the region-of-attention specifying unit 23 on the display 14 (distinguishably display; step ST13). The radiologist inputs the finding sentence into the sentence display region 52 as necessary while viewing the display on the display 14.

Next, an interpretation report is created using the finding sentence input by the radiologist (step ST14). Then, in a case where the OK button 58 is selected by the radiologist, the created interpretation report is stored in the storage 13 together with the target medical image G0 and the detection result (step ST15). Further, the created interpretation report is transferred to the report server 7 together with the target medical image G0 and the detection result (step ST16), and the process of the secondary interpretation ends.

As described above, in the first embodiment, the detection result of the region of interest by the analysis unit 22 and the specification result of the region of attention by the region-of-attention specifying unit 23 are distinguishably displayed on the display 14. Therefore, the radiologist can easily confirm the presence of the abnormal shadow that may have been overlooked at the time of the primary interpretation, and as a result, the burden on the doctor at the time of interpreting the medical image can be reduced.

Next, a second embodiment of the present disclosure will be described. The configuration of the medical image display apparatus according to the second embodiment is the same as the configuration of the medical image display apparatus according to the first embodiment shown in FIG. 3, and only the process to be performed is different. Therefore, the detailed description of the apparatus will not be repeated here.

In the first embodiment, among the regions of interest detected in the tomographic image, the circular mark is added to the non-attention region of interest to highlight the non-attention region of interest. The second embodiment is different from the first embodiment in that the display control unit 25 displays a paging slider that schematically shows positions of tomographic planes of a plurality of tomographic images and highlights a position of a tomographic plane of a tomographic image including a non-attention region of interest which is a region of interest other than an attention region of interest among the regions of interest included in the detection result in the paging slider.

Figure 10:
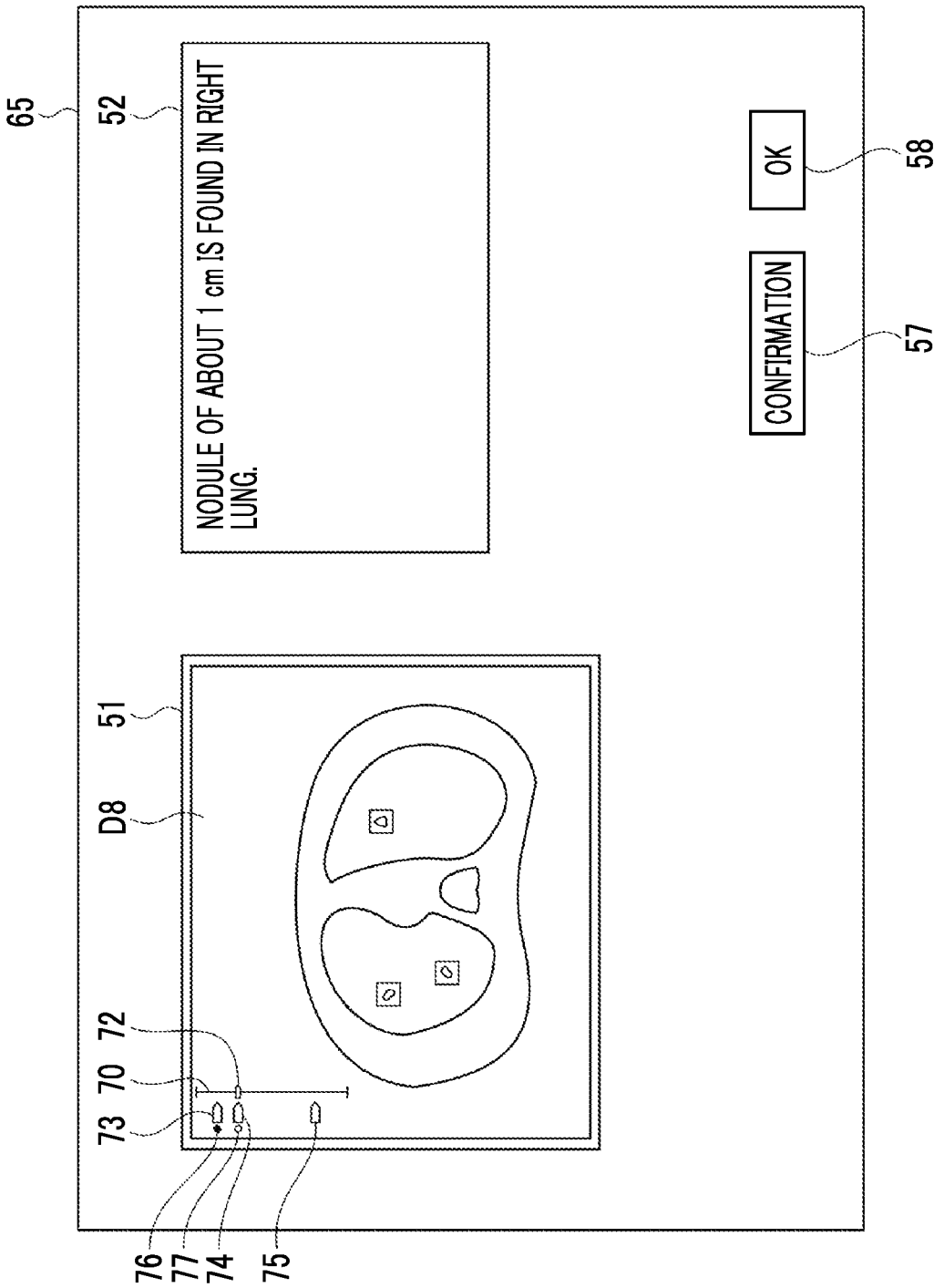
FIG. 10 is a diagram showing a display screen for a detection result of a region of interest and a specification result of an attention region of interest in a second embodiment.

FIG. 10 is a diagram showing a display screen for a detection result of a region of interest and a specification result of an attention region of interest in the second embodiment. In FIG. 10, the same components as those in FIG. 7 are denoted by the same references, and the detailed description thereof will not be repeated. As shown in FIG. 10, the tomographic image D8 is displayed in the image display region 51 of a display screen 65. Further, a paging slider 70 is displayed on the tomographic image D8. The paging slider 70 schematically represents positions of tomographic planes of tomographic images D1 to Dm from the top toward the bottom, and a slider 72 is displayed at the position of the tomographic plane of the tomographic image being displayed. In addition, marks 73 to 75 indicating that the region of interest is included are added to the positions of the tomographic planes corresponding to the tomographic images D4, D8, and D20 including the region of interest in the paging slider 70.

Here, as shown in FIG. 6, the tomographic image D4 includes the regions of interest R1 and R2 detected by the analysis unit 22, but the regions of interest R1 and R2 are not specified as the attention region of interest. The tomographic image D8 includes the regions of interest R3 to R5 detected by the analysis unit 22, but among them, the region of interest R4 is not specified as the attention region of interest. In the second embodiment, the display control unit 25 highlights the position of the tomographic plane of the tomographic image including the non-attention region of interest in the paging slider 70.

In particular, in the second embodiment, the position of the tomographic plane of the tomographic image in which all of the included regions of interest are the non-attention regions of interest and the position of the tomographic plane of the tomographic image in which a part of the included regions of interest is the non-attention region of interest are distinguishably highlighted. Specifically, the display control unit 25 adds a black circle mark 76 to a left side of the mark 73 corresponding to the tomographic plane of the tomographic image D4 in which all of the included regions of interest are the non-attention regions of interest, among the marks 73 to 75 indicating the tomographic planes of the tomographic image including the region of interest, which are added to the paging slider 70. Further, the display control unit 25 adds a white circle mark 77 on a left side of the mark 74 corresponding to the tomographic plane of the tomographic image D8 in which a part of the included regions of interest is the non-attention region of interest.

As described above, in the second embodiment, the position of the tomographic plane of the tomographic image including the non-attention region of interest among the regions of interest included in the detection result is highlighted in the paging slider 70. Therefore, the radiologist can easily confirm the presence of the tomographic image including the abnormal shadow that may have been overlooked at the time of the primary interpretation, and as a result, the burden on the doctor at the time of interpreting the medical image can be reduced.

Further, in the second embodiment, the position of the tomographic plane of the tomographic image in which all of the included regions of interest are the non-attention regions of interest and the position of the tomographic plane of the tomographic image in which a part of the included regions of interest is the non-attention region of interest are distinguishably highlighted. Therefore, the radiologist can distinguishably confirm the tomographic image including the abnormal shadow which has been entirely overlooked at the time of the primary interpretation and the tomographic image including the abnormal shadow which has been partially overlooked at the time of the primary interpretation. Accordingly, the burden on the doctor in a case of interpreting the medical image can be reduced.

Figure 11:
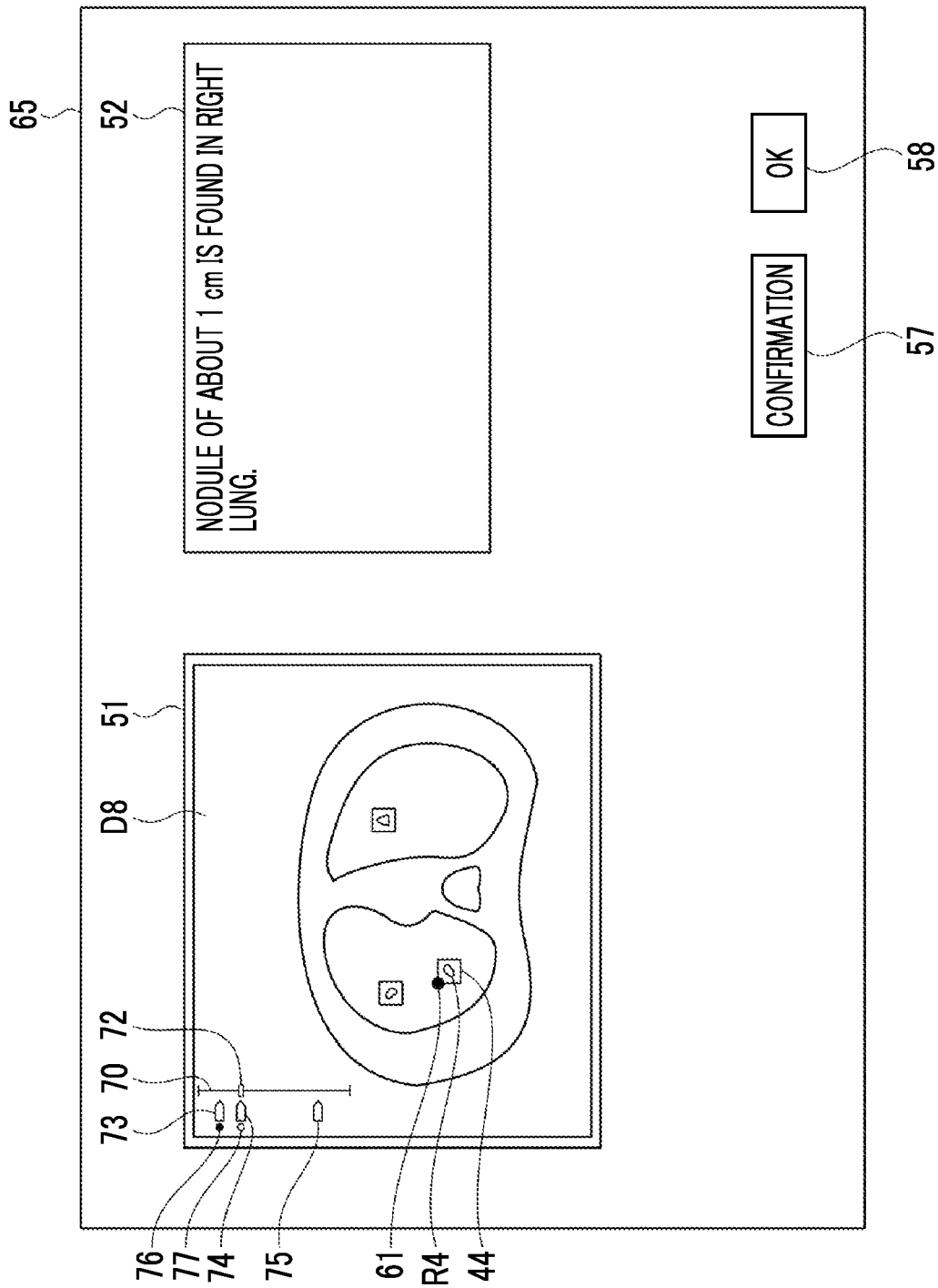
FIG. 11 is a diagram showing a display screen for the detection result of the region of interest and the specification result of the attention region of interest in the second embodiment.

In the second embodiment, as in the display screen 65 shown in FIG. 11, in the tomographic image D8 being displayed, in addition to the rectangular mark 44, the circular mark 61 may be added to the region of interest R4 which is the non-attention region of interest among the regions of interest R3 to R5 detected by the analysis unit 22, as in the first embodiment. In a case where the tomographic image D4 is displayed, circular marks may be added to the rectangular marks 41 and 42 surrounding the regions of interest R1 and R2, respectively.

In the second embodiment, the position of the tomographic plane of the tomographic image in which all of the included regions of interest are the non-attention regions of interest and the position of the tomographic plane of the tomographic image in which a part of the included regions of interest is the non-attention region of interest are distinguishably highlighted, but the present disclosure is not limited thereto. The same mark may be added without distinguishing between the position of the tomographic plane of the tomographic image in which all of the included regions of interest are the non-attention regions of interest and the position of the tomographic plane of the tomographic image in which a part of the included regions of interest is the non-attention region of interest.

In the first and second embodiments, the non-attention region of interest is specified among the regions of interest included in the detection result, and the non-attention region of interest is highlighted, but the present disclosure is not limited thereto. Among the regions of attention specified by the radiologist, an attention region of interest other than the region of interest included in the detection result by the analysis unit 22 may be specified, and the specified attention region of interest may be highlighted. That is, an attention region of interest specified by the radiologist but not detected by the analysis unit 22 may be highlighted.

Figure 12:
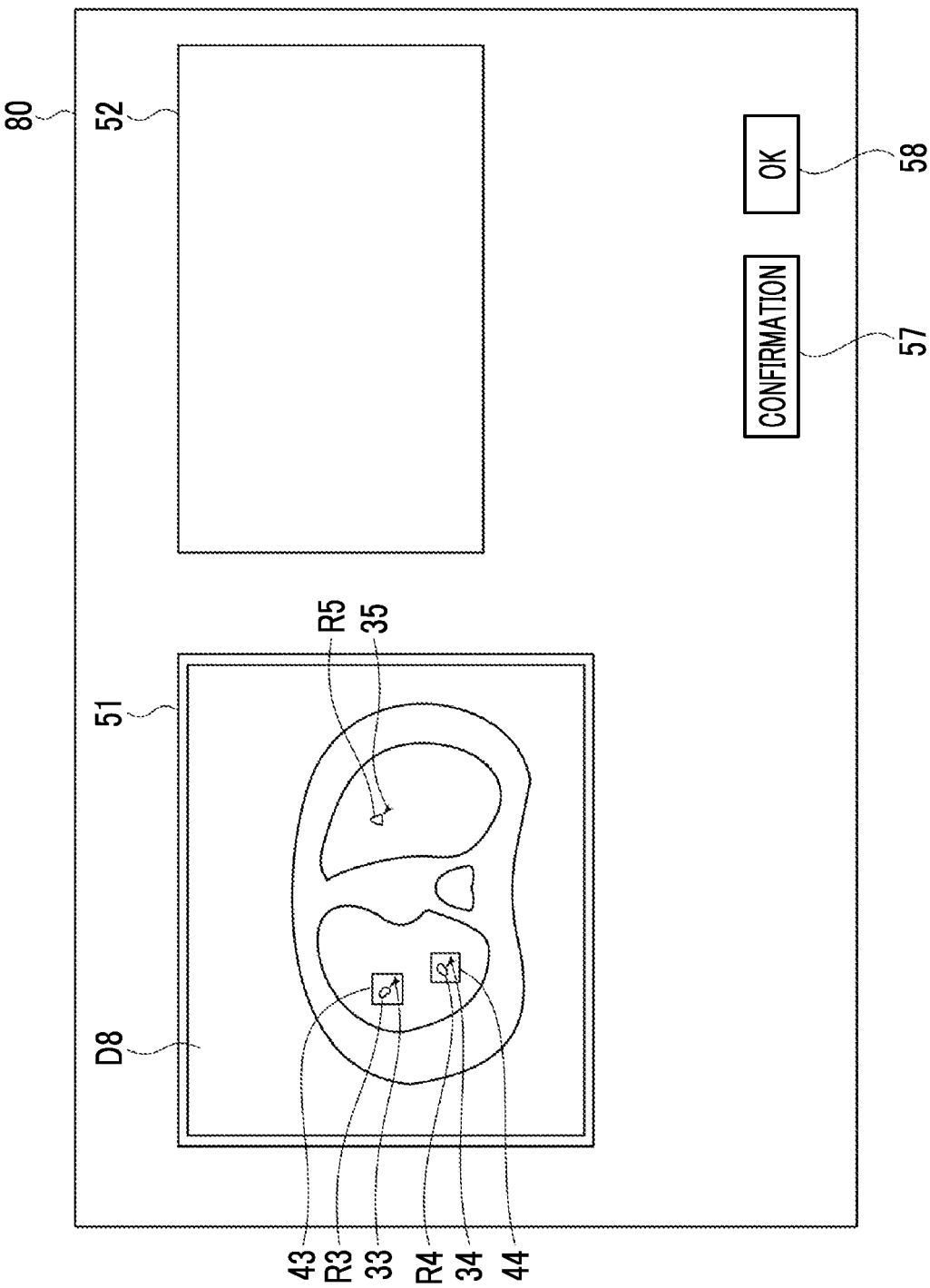
FIG. 12 is a diagram showing a display screen on which a region of attention specified by the radiologist but not detected by the analysis unit is highlighted.

FIG. 12 is a diagram showing a display screen on which the region of attention specified by the radiologist but not detected by the analysis unit 22 is highlighted. In FIG. 12, the same components as those in FIG. 7 are denoted by the same references, and the detailed description thereof will not be repeated. As shown in FIG. 12, the tomographic image D8 is displayed in the image display region 51 of a display screen 80. Here, it is assumed that all three abnormal shadows included in the tomographic image D8 are specified as the attention regions of interest R3 to R5. Further, it is assumed that the analysis unit 22 detects two abnormal shadows of the right lung as the regions of interest R3 and R4. In this case, to the regions of interest R3 and R4, the marks 33 and 34 representing the attention region of interest are added, and the rectangular marks 43 and 44 representing the region of interest detected by the analysis unit 22 are added. On the other hand, only the mark 35 representing the attention region of interest is added to the region of interest R5. Accordingly, the region of interest R5 specified by the radiologist but not detected by the analysis unit 22 is highlighted.

Figure 13:
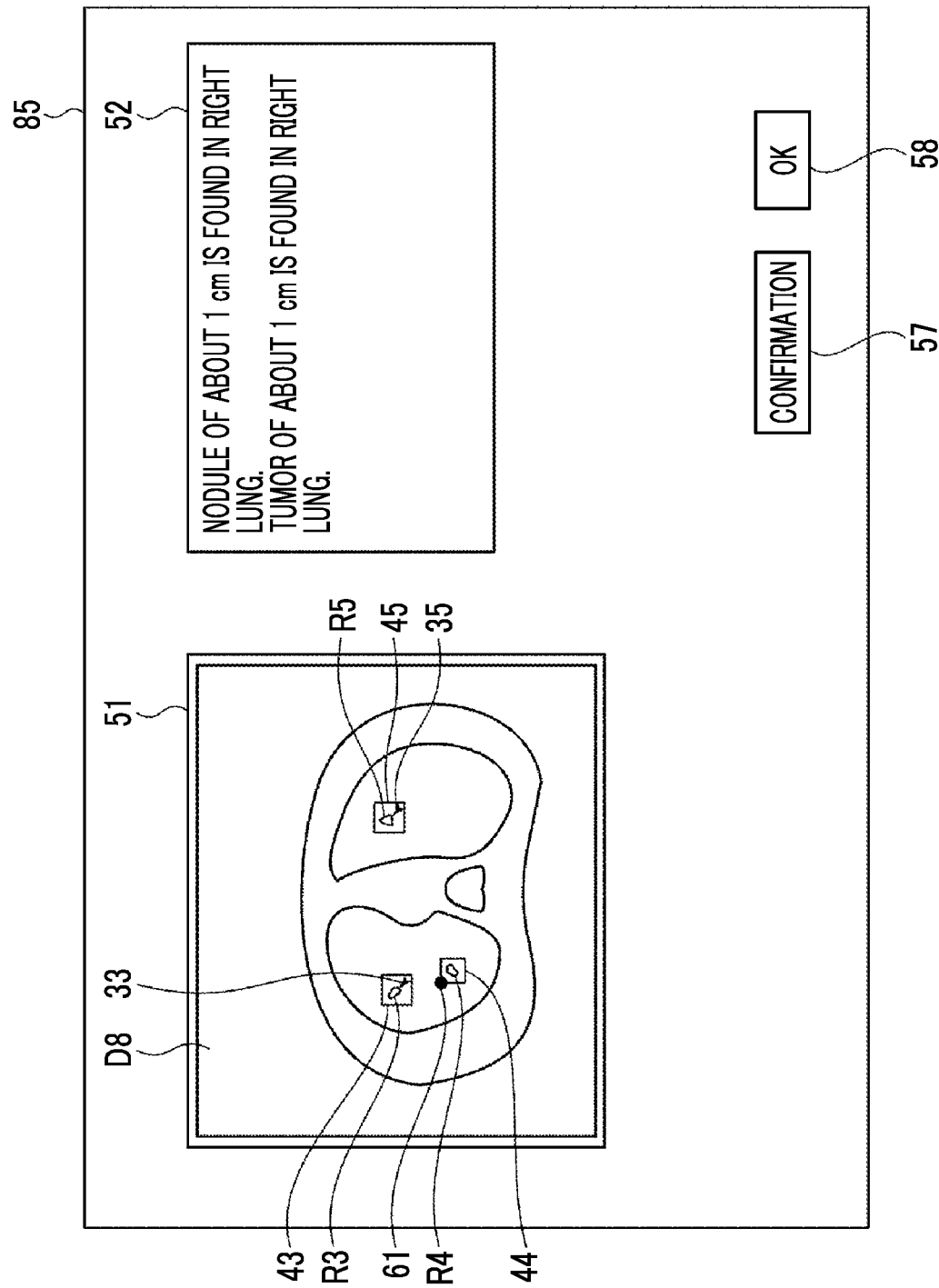
FIG. 13 is a diagram showing a display screen on which a mark representing an attention region of interest is further added.

In the first embodiment, the circular mark 61 is added to highlight the non-attention region of interest, but the present disclosure is not limited thereto. In addition to or instead of the mark for highlighting the non-attention region of interest, a mark representing the attention region of interest may be added to the attention region of interest. FIG. 13 is a diagram showing a display screen on which a mark representing the attention region of interest is further added. In FIG. 13, the same components as those in FIG. 7 are denoted by the same references, and the detailed description thereof will not be repeated.

As shown in FIG. 13, the tomographic image D8 is displayed in the image display region 51 of a display screen 85. In the tomographic image D8, the rectangular marks 43 to 45 are added to the regions of interest R3 to R5 detected by the analysis unit 22, respectively. Among the regions of interest R3 to R5 detected by the analysis unit 22, in addition to the rectangular mark 44, the circular mark 61 is added to the region of interest R4 which is the non-attention region of interest. The arrow-shaped marks 33 and 35 representing that the regions of interest R3 and R5 are specified as the region of attention are added to the regions of interest R3 and R5 which are the attention region of interest.

Figure 14:
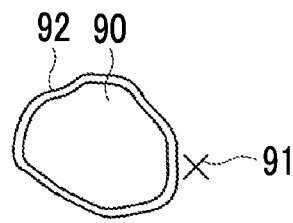
FIG. 14 is a diagram showing a positional relationship between the region of attention and the region of interest.

In the first and second embodiments, the position of the region of attention specified by the radiologist may be shifted from the position of the region of interest detected by the analysis unit 22. For example, as shown in FIG. 14, it is assumed that a position specified by the radiologist for an abnormal shadow 90 is a position 91 indicated by an X mark, and an abnormal shadow detected by the analysis unit 22 is a region of interest 92. In this case, the non-attention region of interest may be specified from a positional relationship between the region of interest 92 and the position 91. For example, in a case where a distance between a centroid of the region of interest 92 detected by the analysis unit 22 and the position 91 is equal to or greater than a predetermined threshold value Th1, the region of interest 92 may be specified as the non-attention region of interest. Further, in a case where a shortest distance between the position 91 and an outer edge of the region of interest 92 is equal to or greater than a predetermined threshold value Th2, the region of interest 92 may be specified as the non-attention region of interest.

The analysis unit 22 may detect the region of interest by a point representing a position of the region of interest. For example, a centroid position of the region of interest may be detected as the region of interest. In such a case, the non-attention region of interest may be specified from a positional relationship between a point representing the detected region of interest and the position 91. For example, in a case where a distance between the point representing the region of interest 92 detected by the analysis unit 22 and the position 91 is equal to or greater than a predetermined threshold value Th3, the region of interest 92 may be specified as the non-attention region of interest.

Figure 15:
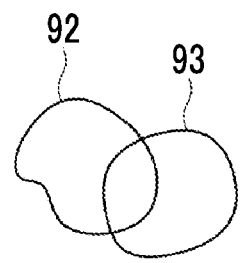
FIG. 15 is a diagram showing a positional relationship between the region of attention and the region of interest.

In some cases, the radiologist specifies a region of attention not by a point but by a range. In such a case, the non-attention region of interest may be specified according to a degree of overlap between the specified region of attention and the region of interest. For example, as shown in FIG. 15, in a case where a region of attention 93 specified by the radiologist overlaps with the region of interest 92 detected by the analysis unit 22, the region of interest 92 may be specified as the attention region of interest, and in a case where the region of attention 93 does not overlap with the region of interest 92, the region of interest 92 may be specified as the non-attention region of interest. In addition, an area of an overlapping region between the region of attention 93 specified by the radiologist and the region of interest 92 detected by the analysis unit 22 may be derived, and in a case where a ratio of the derived area to the region of attention 93 or the region of interest 92 is less than a predetermined threshold value Th4, the region of interest 92 may be specified as the non-attention region of interest.

Figure 16:
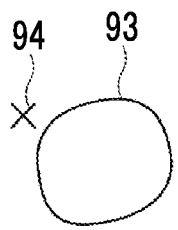
FIG. 16 is a diagram showing a positional relationship between the region of attention and the region of interest.

There is a case where the radiologist specifies the region of attention not by a point but by a range and the analysis unit 22 detects the region of interest by a point. In such a case, the non-attention region of interest may be specified depending on whether or not a point representing the region of interest detected by the analysis unit 22 is present within the region of attention specified by the radiologist. For example, as shown in FIG. 16, in a case where a point 94 representing the region of interest detected by the analysis unit 22 is not present within the region of attention 93 specified by the radiologist, the region of interest 94 may be specified as the non-attention region of interest.

In each of the above-described embodiments, the analysis unit 22 detects the region of interest from the target medical image G0, but the present disclosure is not limited thereto. An analysis apparatus provided separately from the medical image display apparatus 20 according to the present embodiment may analyze the target medical image G0, and the information acquisition unit 21 may acquire an analysis result acquired by the analysis apparatus. In some cases, the medical care WS 4 can analyze the medical image. In such a case, the information acquisition unit 21 of the medical image display apparatus 20 according to the present embodiment may acquire an analysis result acquired by the medical care WS 4. In a case where the analysis result is registered in the image database 6 or the report database 8, the information acquisition unit 21 may acquire the analysis result from the image database 6 or the report database 8.

In each of the above-described embodiments, the technology of the present disclosure is applied in a case where the interpretation report is created using the medical image in which the diagnosis target is the lung or the liver, but the diagnosis target is not limited to the lung or the liver. In addition to the lung, any part of the human body such as the heart, the brain, the kidney, and the limbs can be the diagnosis target.

In each of the above-described embodiments, for example, the following various processors can be used as a hardware structure of processing units performing various processes, such as the information acquisition unit 21, the analysis unit 22, the region-of-attention specifying unit 23, the collation unit 24, and the display control unit 25. As described above, in addition to the CPU which is a general-purpose processor executing software (program) to function as various processing units, the various processors include a programmable logic device (PLD) which is a processor capable of changing a circuit configuration after manufacture such as a field programmable gate array (FPGA), a dedicated electric circuit which is a processor having a circuit configuration exclusively designed to execute specific processing such as an application specific integrated circuit (ASIC), and the like.

One processing unit may be configured by one of the various processors, or may be configured by a combination of two or more processors of the same type or different types (for example, a combination of a plurality of FPGAs or a combination of a CPU and an FPGA). In addition, a plurality of processing units may be configured by one processor.

As an example in which the plurality of processing units are configured by one processor, first, as typified by a computer such as a client or a server, there is a form in which one processor is configured by a combination of one or more CPUs and software and this processor functions as the plurality of processing units. Second, as typified by a system on chip (SoC) or the like, there is a form in which a processor that realizes functions of an entire system including a plurality of processing units with one integrated circuit (IC) chip is used. As described above, the various processing units are configured using one or more of the various processors as a hardware structure.

Furthermore, as the hardware structure of the various processors, more specifically, an electric circuit (circuitry) in which circuit elements such as semiconductor elements are combined can be used.

What is claimed is:

1. A medical image display apparatus comprising at least one processor,
   wherein the processor is configured to:
   acquire a detection result of at least one region of interest included in a medical image, which is detected by analyzing the medical image;
   specify at least one region of attention to which a user has paid attention in the medical image;
   distinguishably display the detection result of the region of interest and a specification result of the region of attention on a display;
   collate the detection result of the region of interest with the specification result of the region of attention to specify a non-attention region of interest other than the region of attention among the regions of interest included in the detection result; and
   highlight the non-attention region of interest on the display.

2. The medical image display apparatus according to claim 1,
   wherein the processor is further configured to:
   collate the detection result of the region of interest with the specification result of the region of attention to specify an attention region of interest other than the region of interest included in the detection result among the regions of attention; and
   highlight the attention region of interest.

3. The medical image display apparatus according to claim 1,
   wherein the processor is configured to, in a case where the medical image is a three-dimensional image consisting of a plurality of tomographic images:
   display a paging slider schematically showing positions of tomographic planes of the plurality of tomographic images;
   collate the detection result of the region of interest with the specification result of the region of attention to specify a tomographic image including the non-attention region of interest other than the region of attention among the regions of interest included in the detection result; and
   highlight a position of a tomographic plane of the specified tomographic image in the paging slider.

4. The medical image display apparatus according to claim 3,
   wherein the processor is configured to distinguishably highlight a position of a tomographic plane of a tomographic image in which all included regions of interest are the non-attention regions of interest and a position of a tomographic plane of a tomographic image in which a part of the included regions of interest is the non-attention region of interest.

5. The medical image display apparatus according to claim 1,
   wherein the processor is configured to acquire the detection result of at least one region of interest included in the medical image by analyzing the medical image.

6. The medical image display apparatus according to claim 1,
   wherein the processor is configured to specify the region of attention based on an operation of the user at a time of interpretation of the medical image.

7. A medical image display method comprising:
   acquiring a detection result of at least one region of interest included in a medical image, which is detected by analyzing the medical image;
   specifying at least one region of attention to which a user has paid attention in the medical image;

distinguishably displaying the detection result of the region of interest and a specification result of the region of attention on a display;

collating the detection result of the region of interest with the specification result of the region of attention to specify a non-attention region of interest other than the region of attention among the regions of interest included in the detection result; and highlighting the non-attention region of interest on the display.

8. A non-transitory computer-readable storage medium that stores a medical image display program causing a computer to execute:

a step of acquiring a detection result of at least one region of interest included in a medical image, which is detected by analyzing the medical image;

a step of specifying at least one region of attention to which a user has paid attention in the medical image;

a step of distinguishably displaying the detection result of the region of interest and a specification result of the region of attention on a display;

a step of collating the detection result of the region of interest with the specification result of the region of attention to specify a non-attention region of interest other than the region of attention among the regions of interest included in the detection result; and a step of highlighting the non-attention region of interest on the display.

\* \* \* \* \*